Dec. 22, 1964        J. E. ANDERSON ETAL        3,162,052
                PENDULOUS GYROSCOPIC ACCELEROMETERS
Filed Sept. 6, 1962                           3 Sheets-Sheet 1

INVENTORS.
JOHN EDWARD ANDERSON
ISAAC W. METZGER
BY
Roger W. Jensen
ATTORNEY

Dec. 22, 1964   J. E. ANDERSON ETAL   3,162,052
PENDULOUS GYROSCOPIC ACCELEROMETERS
Filed Sept. 6, 1962   3 Sheets-Sheet 2

INVENTORS.
JOHN EDWARD ANDERSON
ISAAC W. METZGER
BY
ATTORNEY

Dec. 22, 1964    J. E. ANDERSON ETAL    3,162,052
PENDULOUS GYROSCOPIC ACCELEROMETERS
Filed Sept. 6, 1962    3 Sheets-Sheet 3

INVENTORS.
JOHN EDWARD ANDERSON
ISAAC W. METZGER
BY
Roger W. Jensen
ATTORNEY

United States Patent Office 3,162,052
Patented Dec. 22, 1964

3,162,052
PENDULOUS GYROSCOPIC ACCELEROMETERS
John Edward Anderson, Golden Valley, and Isaac W. Metzger, Minneapolis, Minn., assignors to Honeywell Inc., a corporation of Delaware
Filed Sept. 6, 1962, Ser. No. 221,700
5 Claims. (Cl. 73—504)

This invention pertains to a gimballess inertial reference system and more particularly to means for greatly reducing drift and mechanical errors in a gimballess inertial reference system.

In a gimballess inertial system of the type described in the copending application of John Edward Anderson filed May 29, 1959, Serial No. 816,959, and assigned to the same assignee as the present application, six pendulous gyro accelerometers or three single axis platforms and three pendulous gyro accelerometers are mounted so that their input axes are in an equiangular fixed position with respect to the thrust vector or linear acceleration it is desired to measure. These six inertial devices are so positioned that they form three pairs, each pair having parallel or aligned input axes. Each inertial instrument is then caused to be continuously rotated with respect to the vehicle or device upon which the system is mounted, as long as that vehicle or device is being accelerated. This continuous rotation is caused by a closed loop about each of the inertial devices and the input acceleration being present along a rotational axis of each of the inertial devices, as fully explained in the copending application of Anderson. In a given pair, each of the inertial devices is caused to rotate at an approximately equal but opposite speed. The speed of rotation of each of the devices is directly proportional to the amount of accelerational force applied thereto. An electrical indication of the speed is picked off from each device and applied to a computer where the signals representative of the speeds of the pairs of inertial devices are combined in various ways to reduce a great many of the drift errors present in this type of system, especially those due to angular motion, cross coupling, and mass unbalance.

It should be noted that the great reduction in drift errors which a pair of inertial devices, such as pendulous gyro accelerometers, rotating continuously in opposite directions can give is based upon the assumption that the input axes of each of the devices are aligned or concentric with each other, and the reduction in errors is contingent upon the input axes remaining aligned or concentric. Any slight deviation from alignment of the input axes, if predictable, can be compensated in the computer. However, any misalignment of the input axes which is not predictable, and therefore cannot be compensated, may greatly increase the errors of the system.

In the prior art devices pairs of inertial devices are mounted on opposite sides of a cube and caused to rotate by mechanically independent means. Thus, several surfaces are involved which have to be ground extremely accurately and any runout or mechanical imperfections in the bearings or in the separate mechanical mounting means cause a great deal of misalignment of the input axes.

In the present invention each inertial device has a cylindrical case with one end highly polished and perpendicular to the input axis. A pair of these inertial devices are placed within a hollow cylinder so that the highly polished surfaces are adjacent and the input axes are concentric. The pair of inertial devices are rotatably mounted within the hollow cylinder by some mounting means such as hydrostatic bearings and the devices may be rotated by some means such as utilizing the case for a hysteresis rotor and providing stator windings in the body of the hollow cylinder. Thus, the number of surfaces which would multiply the misalignment errors have been reduced to two and the rotational and mounting means are so designed that any imperfection tending to cause misalignment will cause an equal and opposite misalignment in the other inertial device in the pair, thereby, reducing or completely nulling out the overall effect.

It is a primary object of this invention to provide an improved gimballess inertial navigation system.

It is a further object of this invention to provide means for reducing errors in gimballess inertial systems.

These and other objects of this invention will become apparent from the following description of a preferred form thereof and the accompanying specification, claims, and drawings, of which:

Figure 1:
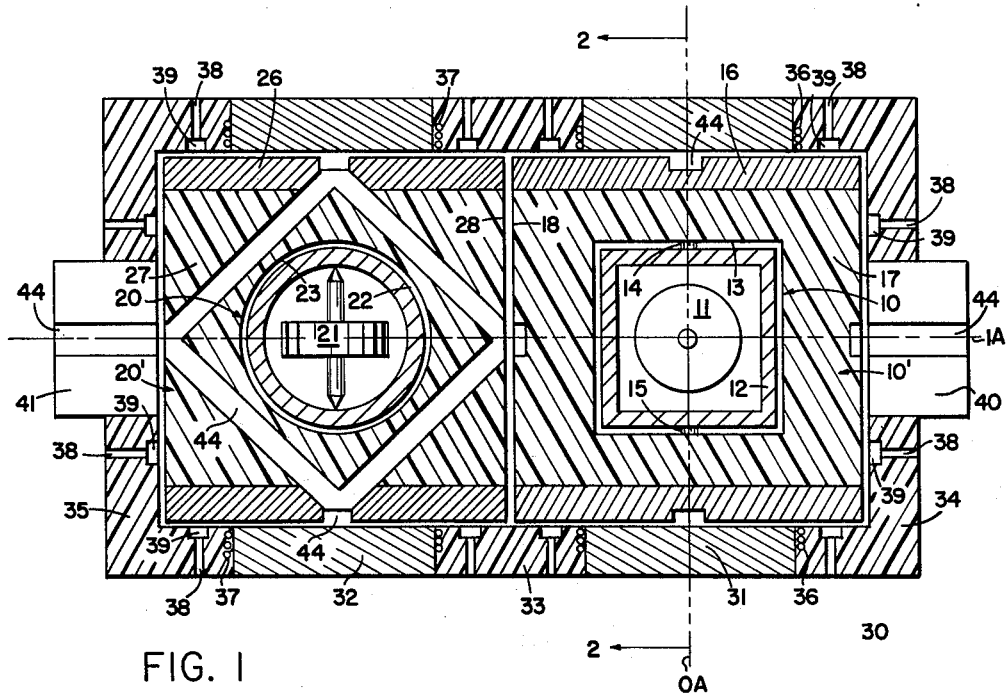
FIGURE 1 is an elevation view, partially in section, of the present invention.

In FIGURE 1 the numeral 10 designates a first pendulous gyro accelerometer. The operation of the pendulous gyro accelerometer is fully explained in the co-pending application of Vernon H. Aske and Arthur D. Glick Serial No. 774,952, filed November 19, 1958, now Patent No. 3,041,883, and assigned to the same assignee. The drawing of the pendulous gyro accelerometer 10 is a representative drawing for simplicity, however, it should be noted that the accelerometer 10 would actually look similar to the gyroscope in the Jarosh et al. Patent, 2,752,-791, issued July 3, 1956. Pendulous gyro accelerometer 10 is comprised of a spin motor 11 and a gimbal 12. Spin motor 11 is rotatably mounted within gimbal 12 to form a spin reference axis, SRA, which in accelerometer 10 is perpendicular to the paper. The gimbal 12 is attached to a case 13 by means of a pair of pivot and jewel bearings 14 and 15. Pivot and jewel bearings 14 and 15 form the output axis OA of the accelerometer 10. However, it should be noted that gimbal 12 might be supported by a hydrostatic bearing. Accelerometer 10 is centrally mounted within an outer cylindrical casing 16 by means of a plastic or ceramic fill 17. Accelerometer 10 is further mounted within cylindrical outer casing 16 so that the input axis, IA which is mutually perpendicular to the SRA and the OA, is along the longitudinal axis of cylindrical casing 16. Cylindrical casing 16 is made of some material having a high hysteresis characteristic so that it may be utilized as the rotor of a hysteresis motor, as will be explained later. The overall assembly of accelerometer 10 and cylindrical casing 16 will henceforth be referred to as the accelerometer assembly 10'. The ceramic fill 17 and the outer cylindrical casing 16 are polished to form a smooth surface 18 perpendicular to the input axis.

A second pendulous gyro accelerometer 20 is comprised of a spin motor 21 rotatably mounted within a gimbal 22 which is rotatably mounted within a casing 23. Casing 23 is solidly mounted within an outer cylindrical casing 26 by means of a plastic or ceramic fill 27. Cylindrical casing 26 and ceramic fill 27 are polished to form one smooth side 28 perpendicular to the input axis. It should be noted that accelerometer 10 and accelerometer 20 are similar in this preferred embodiment. Cylindrical casing 26 is made of some material having a high hysteresis characteristic so that it may be utilized as the rotor of a hysteresis motor. The overall assembly of accelerometer 20 and casing 26 will henceforth be referred to as accelerometer assembly 20'.

The numeral 30 indicates an outer housing having a cylindrical aperture therethrough with a diameter slightly larger than the outer diameter of the hysteresis rings 16 and 26 which form the outer diameter of accelerometer assemblies 10' and 20' respectively. Housing 30 is comprised of a first stator 31 and a second stator 32 spaced apart, along the longitudinal axis, and permanently attached by a cylindrical section 33 of ceramic or other non-ferrous material. A section of non-ferrous material 34 is solidly attached to the right hand side of core 31 and has a cylindrical portion extending radially inward to form the right hand extremity of the cylinder defined by core 31, core 32, and section 33. A second cylindrical section of non-ferrous material 35 is attached to the left hand side of core 32 and has a cylindrical portion extending radially inward to form the left hand extremity of the cylinder defined by core 31, core 32, and section 33.

Figure 2:
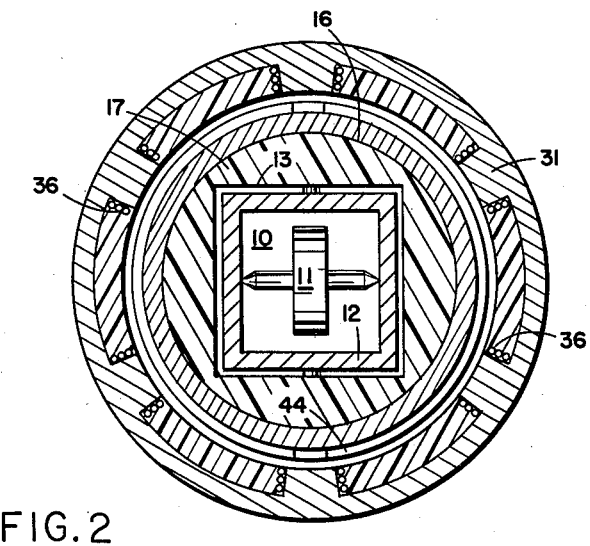
FIGURE 2 is an end view, partially in section, of the present invention.

Cores 31 and 32 are similar and can be seen more clearly in the partial sectional end view of FIGURE 2. The core 31 is a laminated structure, comprised of magnetic material, having six salient poles extending radially inward the faces of which form a portion of the surface of the cylindrical aperture in housing 30. A plurality of windings 36 are disposed about the poles of core 31 to produce a rotating magnetic field, when properly energized, in either a clock-wise or a counter clock-wise direction as desired. Windings 36 are shown pictorially to simplify the drawings, since core 31 and windings 36 form a simple hysteresis motor stator and are constructed in a manner well known in the art. The stator, comprised of windings 36 and core 31, is utilized to rotate accelerometer assembly 10', comprised of accelerometer 10 firmly mounted within the hysteresis ring 16, about the IA in a manner well known in the art. A plurality of windings 37 disposed about the six salient poles on core 32 form a stator winding utilized to rotate accelerometer assembly 20', comprised of accelerometer 20 firmly mounted within hysteresis ring 26, about the IA.

The accelerometer assembly 10' is rotatably mounted approximately centrally within core 31 by means of hydrostatic bearings. The accelerometer assembly 20' is rotatably mounted approximately centrally within core 32 by means of hydrostatic bearings. The hydrostatic bearings are comprised of a plurality of fluid pressure ducts 38, a plurality of bearing pads 39 and a plurality of fluid exit ducts 44 disposed about the accelerometer assembly 10', and the accelerometer assembly 20' to maintain them approximately centrally within the cylindrical opening of housing 30 and so that side 18 of accelerometer assembly 10' is adjacent and parallel to side 28 of accelerometer assembly 20'. In this preferred embodiment a thin film of fluid is maintained between accelerometer assemblies 10' and 20' by means of the centrally located exit duct 44. All of the exit ducts have been designated 44 since the ducts shown are simply representative of the overall hydrostatic system that would be used. It should be understood that any means may be utilized for rotatably mounting accelerometer assemblies 10' and 20' within the cylindrical opening of housing 30. The hydrostatic bearing means disclosed here is simply a preferred method. Also, it should be understood that accelerometer assemblies 10' and 20' might be rotated by the same fluid which rotatably mounts them, rather than the motor method disclosed.

A pair of pickoffs 40 and 41, shown in block form in FIGURE 1, are utilized to indicate the rotation of accelerometer assemblies 10' and 20' respectively. Pickoffs 40 and 41 may be an optical pickoff similar to that disclosed in the copending application of Aske and Glick.

Figure 3:
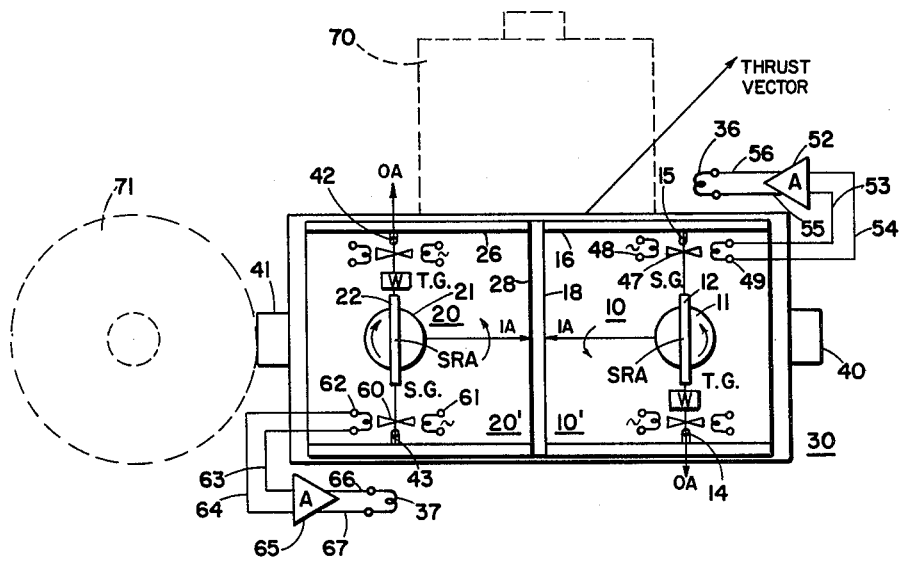
FIGURE 3 is a schematic view of the present invention.

FIGURE 3 is a schematic diagram of accelerometers 10 and 20 showing the orientation of the various axes in relation to the thrust vector. The gimbal 12 of gyro 10 is rotatably attached to the gyro case by supports 14 and 15. In this schematic representation the gimbal 12 is shown attached directly to the hysteresis ring 16 and the gyro case 13 and ceramic material 17 are omitted for simplicity. The supports 14 and 15 define the OA of the accelerometer 10 and rotatably mount gimbal 12 for rotation about the OA. The spin motor 11 is mounted within gimbal 12 so that its axis of rotation is perpendicular to the OA. In this embodiment the spin motor 11 is energized to rotate in a counter clock-wise direction as indicated by the arrow. As is will known to those skilled in the art, the input axis of accelerometer 10 is perpendicular to the OA and the SRA and, in this embodiment, lies along the longitudinal axis of accelerometer assembly 10'.

Gimbal 22 of accelerometer 20 is rotatably attached to the accelerometer case by supports 42 and 43. In the simplified schematic drawing of FIGURE 3, supports 42 and 43 are attached directly to the hysteresis ring 26 to simplify the drawing. Spin motor 21 is rotatably mounted within gimbal 22 for rotation about the spin reference axis SRA. In this embodiment, spin motor 21 is energized for rotation in a clock-wise direction as shown by the arrow. The input axis IA of accelerometer 10 is mutually perpendicular to the SRA and OA and lies along the longitudinal axis of the accelerometer assembly 20' parallel with the IA of accelerometer 10 and substantially aligned therewith. The smooth side 18 of accelerometer assembly 10' and the smooth side 28 of accelerometer assembly 20' are shown adjacent and parallel, and perpendicular to the IA's of accelerometer 10 and accelerometer 20.

Means are provided in accelerometer 10 for producing a signal representative of movement or rotation of gimbal 12 about the output axis OA. This signal generating means is labeled SG and includes a rotor element 47 connected to gimbal 12, and a pair of windings 48 and 49. Winding 48 schematically represents an excitation winding which is energized by a suitable source of alternating current, and winding 49 schematically represents an output winding adapted to have induced therein alternating signals of variable phase and magnitude indicative respectively of the sense and magnitude of rotation of gimbal 12 about the OA. Output winding 49 is connected to an amplifier 52 by a pair of suitable connecting means 53 and 54. Amplifier 52 is further connected to windings 36 through a pair of connecting leads 55 and 56. In the normal preferred mode of operation, rotor element 47 of the signal generator produces a signal upon rotation of the gimbal 12, thereby causing a signal to be sent to amplifier 52 where the signal is amplified and is used to energize windings 36 which in turn cause accelerometer assembly 10' to rotate about the IA within the housing 30. The direction of rotation of accelerometer assembly 10' will depend upon the direction in which gimbal 12 rotates about the OA. That is, the rotation of accelerometer assembly 10' acts as an input about the IA and causes a precession of spin motor 11, in the manner well known in the art, which rotates gimbal 12 about the OA, an equal amount and in an opposite direction, to null out the original input.

Signal generator means are provided in accelerometer 20 for producing a signal representative of movement or rotation of gimbal 22 about the OA. This signal generator includes a rotor element 60 and a pair of windings 61 and 62. Winding 61 schematically represents an excitation winding which is energized by a suitable source of alternating current and winding 62 schematically represents an output winding adapted to have induced therein an alternating signal of variable phase and magnitude indicative respectively of the sense and magnitude of rotation of gimbal 22 about the OA. Winding 62 is connected to an amplifier 65 by a pair of suitable connecting means 63 and 64. Amplifier 65 is further connected to windings 37 of the hysteresis driving means through a pair of connecting leads 66 and 67. The electrical loop just explained operates substantially in conjunction with accelerometer 10.

Assuming the two pickoffs 40 and 41 are optical pickoffs of the type explained in the copending application of Anderson, by adding the pulses from the two pickoffs 40 and 41, signals will be obtained which will be representative of double the increment of rotation of the pickoffs, and the difference in pendulosity between the two accelerometers 10 and 20 provided that the accelerometer assemblies 10' and 20' rotate in opposite directions with respect to each other. In like manner, by subtracting the pulses produced by the two pickoffs 40 and 41, signals will be obtained which are representative of the integral of the output acceleration only, because the signals representative of the angle through which the accelerometer assemblies 10' and 20' are rotated will cancel each other, if the accelerometer assemblies 10' and 20' rotate in opposite directions with respect to each other. Assuming a constant acceleration is applied along the thrust vector, shown in FIGURE 3, the pendulous weight W of accelerometer 10, which extends out of the paper from the OA, will cause gimbal 12 to rotate in a counter clock-wise direction about the OA looking at the arrow. The rotor 47 of the signal generator will induce a signal into winding 49 which will be amplified in amplifier 52 and applied to windings 36 of the hysteresis driving means. The hysteresis driving means will drive the entire accelerometer assembly 10' in a counter clock-wise direction, looking from the right hand side of FIGURE 3, about the IA of accelerometer 10. This input about the IA of accelerometer 10 will cause the rotor 11 to precess, thereby rotating gimbal 12 in a direction to null out the movement caused by the acceleration on weight W. The speed with which the hysteresis driving means will rotate the accelerometer assembly 10' about the IA will be proportional to the acceleration applied along the thrust vector. The constant acceleration along the thrust vector in FIGURE 3 will also cause the pendulous weight W of accelerometer 20, which extends out of the paper in FIGURE 3 to rotate gimbal 22 clock-wise about the OA looking into the arrow. The gimbal 22 movement will cause rotor 60 of the signal generator to induce a signal into winding 62 which will be applied to amplifier 65, amplified, and applied to windings 37 of the hysteresis driving means. The hysteresis driving means will rotate the entire accelerometer assembly 20' about the IA in a clock-wise direction looking from the right hand side. This input about the IA of accelerometer 20 will cause the rotor 21 to precess, thereby rotating gimbal 12 in a direction to null out the movement caused by the acceleration on weight W. Thus, accelerometer assembly 10' and accelerometer assembly 20' are rotating in opposite directions.

The advantages of utilizing the signals from two accelerometers rotating in opposite directions are available as long as the input axes remain substantially parallel and aligned. However, should the input axes become substantially misaligned, the input acceleration would no longer effect both accelerometers equally but oppositely and errors would be induced in the sum and difference signals from the two accelerometers. Also, because the accelerometer assemblies 10' and 20' are rotating continuously about the IA, any wobble about the IA, due to bearing runout or inaccurate alignment, would induce error signals into the accelerometer loops. In the present invention both accelerometers of the pair are mounted in a single unit to greatly reduce the number of critical surfaces and so that any wobble in rotation which is not eliminated will be counter-acted by the rotation of the adjacent accelerometer in the pair. Surface 18 of accelerometer assembly 10' and surface 23 of accelerometer assembly 20' may be separated by a uniform film of fluid, as previously described, or may be highly polished and actually abutting. Thus, once the input axes are aligned during the initial production, they will remain aligned throughout the operation because of the unique mounting arrangement of this invention.

Figure 4:
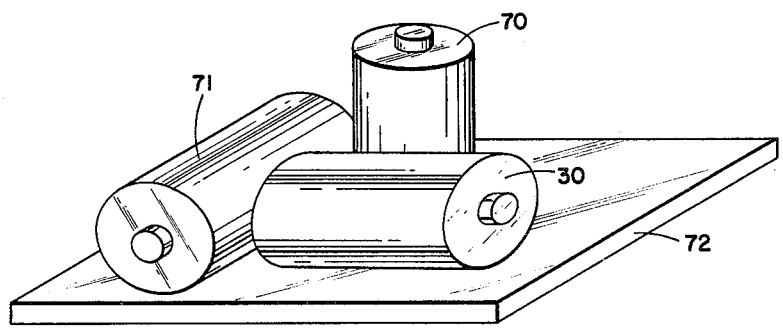
FIGURE 4 is a pictorial view of a gimballess platform showing the relative positions of the inertial elements.

In FIGURE 4 a base means 72 is shown having three pendulous gyro accelerometer units mounted thereon. The three accelerometer units are numbered 30, 70, and 71. In FIGURE 4 no means are shown for attaching the three units to the base means 72, but it should be understood that any means such as clamps, for firmly attaching the unit to the base means, may be utilized. The three accelerometer units 30, 70, and 71 are so oriented, also shown in FIGURE 3, with respect to the thrust vector that any acceleration along the thrust vector will cause the two pendulos gyro accelerometers in each unit to rotate in opposite directions. The entire base means 72 is then oriented within the vehicle so that the thrust vector is pointed in the direction of movement.

Figure 5:
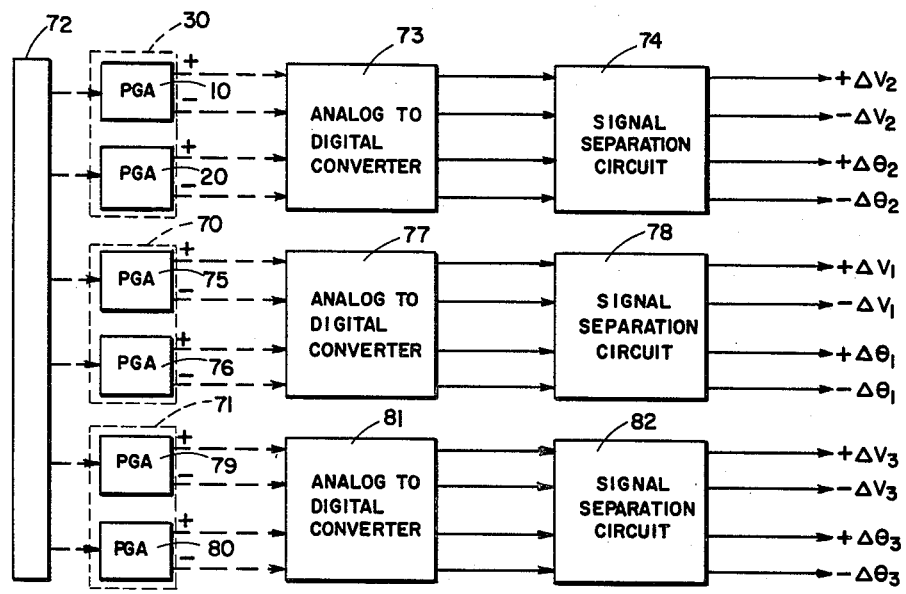
FIGURE 5 is a block diagram of the gimballess platform.

A brief description of the operation of a platform can best be seen by referring to FIGURE 5. The base means or mounting block 72 receives the thrust generated by the vehicle or dirigible craft and any rotational acceleration imparted to the craft and these quantities are transmitted to the six pendulous gyro accelerometers, or three accelerometer units, mounted on mounting block 72. Pendulous gyro accelerometers 10 and 20, which are combined to form the single unit 30, apply their signals to an analog to digital converter 73 which changes the signals from a shaft rotation to a digital pulse output. In the present invention the analog to digital converter would be a portion of the optical pickoff shown in the Aske-Glick application. Positive and negative output pulses from analog to digital converter 73 representative of the rotation of the platform of the pendulous gyro accelerometers 10 and 20 are applied to a signal separation circuit 74. Signal separation circuit 74 separates the signals representative of acceleration terms from the rotational terms and the signals which emerge from signal separation circuit 74 are representative of first components of the total velocity of the craft and the angle to which the craft has rotated about an instant center. The circuitry of the signal separation circuits is fully expained in the copending application of Anderson. In like manner, pendulous gyro accelerometers 75 and 76, contained within unit 70 apply their output signals to an analog to digital converter 77 where the signals are changed into pulse signals. The pulse signals are applied to a signal separation circuit 78 where they are separated into second components representative of velocity of the craft, and rotation of the craft about an instant center. To complete the operation, signals are obtained from pendulous gyro accelerometers 79 and 80, contained within accelerometer unit 71, which are applied to an analog to digital converter 81 where the signals are changed into pulse signals. The pulse signals are applied to a signal separation circuit 82. Third components of the velocity and rotation of the craft about an instant center are generated in signal separation circuit 82 and brought out as output signals. Thus, output signals are obtained that are positive and negative pulse signals representative of each component of velocity of the craft and positive and negative pulse signals representative of each component of rotation of the craft about an instant center, and these signals are represented by symbols $\Delta V$ and $\Delta \theta$ respectively.

Thus, means are disclosed for producing a single unit from a pair of pendulous gyro accelerometers. Because of the unique method of mounting the pair of accelerometers in juxtaposition, the input axes will be maintained parallel and aligned and the advantages, which are obtained by combining the output signals from the two pendulous gyro accelerometers in various ways will be available without inducing errors due to random misalignments of the input axes.

While we have shown and described a preferred embodiment of this invention, the invention should not be limited to the particular form shown, and we intend in the appended claims to cover all modifications which do not depart from the spirit and scope of the invention.

We claim:
1. A gyroscopic device comprising:
   (a) a housing having a cylindrical opening therein;
   (b) first and second pendulous gyro accelerometers each having a spin motor mounted to rotate about a spin axis, a mass pendulously supported for rotation about an acceleration sensitive axis perpendicular to said spin axis and a signal generator responsive to movement of said mass for providing output signals indicative of such movement, each accelerometer being contained within a cylindrical outer casing with an outer diameter smaller than the inner diameter of said cylindrical opening in said housing so that said sensitive axis is substantially parallel to the longitudinal axis of said casing and each of said casings having one end perpendicular to the longitudinal axis of said casings;
   (c) means for rotatably mounting said first and second pendulous gyro accelerometers within said opening in said housing so the input axes of said accelerometers are parallel with the longitudinal axis of said cylindrical opening and said perpendicular ends are adjacent; and
   (d) means for rotating said first and second accelerometers about said sensitive axes.

2. A gyroscopic device comprising:
   (a) a housing having a cylindrical opening therein;
   (b) first and second pendulous gyro accelerometers each having a spin motor mounted to rotate about a spin axis, a mass pendulously supported for rotation about an acceleration sensitive axis perpendicular to said spin axis and a signal generator responsive to movement of said mass for providing output signals indicative of such movement, each accelerometer being contained within a cylindrical outer casing with an outer diameter smaller than the inner diameter of said cylindrical opening in said housing so that said sensitive axis is substantially parallel to the longitudinal axis of said casing and each of said casings having one end perpendicular to the longitudinal axis of said casings;
   (c) means for rotatably mounting said first and second pendulous gyro accelerometers within said opening in said housing so the input axes of said accelerometers are parallel with the longitudinal axis of said cylindrical opening and said perpendicular ends are adjacent;
   (d) means for rotating said first and second accelerometers in opposite directions about said sensitive axes; and
   (e) means connecting said signal generator of said first pendulous gyro accelerometer to said means for rotating said first pendulous gyro accelerometer and means connecting said signal generator of said second pendulous gyro accelerometer to said means for rotating said second pendulous gyro accelerometer.

3. A gyroscopic device comprising:
   (a) a housing having a cylindrical opening therein;
   (b) first and second pendulous gyro accelerometers each having a spin motor mounted to rotate about a spin axis, a mass pendulously supported for rotation about an acceleration sensitive axis perpendicular to said spin axis and a signal generator responsive to movement of said mass for providing output signals indicative of such movement, each accelerometer being contained within a cylindrical outer casing with an outer diameter smaller than the inner diameter of said cylindrical opening in said housing so that said sensitive axis is substantially parallel to the longitudinal axis of said casing and each of said casings having one end perpendicular to the longitudinal axis of said casings;
   (c) means for rotatably mounting said first and second pendulous gyro accelerometers within said opening in said housing so the input axes of said accelerometers are parallel with the longitudinal axis of said cylindrical opening and said perpendicular ends are adjacent;
   (d) means for rotating said first and second accelerometers in opposite directions about said sensitive axes;
   (e) means connecting said signal generator of said first pendulous gyro accelerometer to said means for rotating said first pendulous gyro accelerometer and means connecting said signal generator of said second pendulous gyro accelerometer to said means for rotating said second pendulous gyro accelerometer; and
   (f) means attached to said housing and responsive to rotation of said pendulous gyro accelerometers to provide output signals indicative of accelerations applied to said device along said longitudinal axis, said output signals being relatively free of errors due to drift in said accelerometers.

4. A gyroscopic device comprising:
   (a) a housing having a cylindrical opening therein;
   (b) first and second inertial instruments for sensing motion each having a spin motor mounted to rotate about a spin axis, a signal generator responsive to movement of said instrument about an output axis which is perpendicular to said spin axis and an acceleration sensitive axis mutually perpendicular to said spin axis and said output axis, each instrument being contained within a cylindrical outer casing with an outer diameter smaller than the inner diameter of said cylindrical opening in said housing so that said sensitive axis is substantially parallel to the longitudinal axis of said casing and each of said casings having one end perpendicular to the longitudinal axis of said casings;
   (c) means for rotatably mounting said first and second inertial instruments within said opening in said housing so the input axes of said instruments are parallel with the longitudinal axis of said cylindrical opening and said perpendicular ends are adjacent;
   (d) means for rotating said first and second instruments in opposite directions about said sensitive axes;
   (e) means connecting said signal generator of said first inertial instrument to said means for rotating said first inertial instrument and means connecting said signal generator of said second inertial instrument to said means for rotating said second inertial instrument; and
   (f) means attached to said housing and responsive to rotation of said inertial instruments to provide output signals indicative of accelerations applied to said device along said longitudinal axis, said output signals being relatively free of errors due to drift in said instruments.

5. An inertial reference system for a dirigible craft comprising:
   (a) a first, second, and third gyroscopic device, each gyroscopic device comprising,
      (1) a housing having a cylindrical opening therein;
      (2) first and second pendulous gyro accelerometers each having a spin motor mounted to rotate about a spin axis, a mass pendulously supported for rotation about an acceleration sensitive axis perpendicular to said spin axis and a signal generator responsive to movement of said mass for providing output signals indicative of such movement, each accelerometer being contained within a cylindrical outer casing with an outer diameter smaller than the inner diameter of said cylindrical opening in said housing so that said sensitive axis is substantially parallel to the longitudinal axis of said casing and each of said casings having one end perpendicular to the longitudinal axis of said casings, (3) means for rotatably mounting said first and second pendulous gyro accelerometers within said opening in said housing so the input axes of said accelerometers are parallel with the longitudinal axis of said cylindrical opening and said perpendicular ends are adjacent, (4) means for rotating said first and second accelerometers in opposite directions about said sensitive axes, and (5) means connecting said signal generator of said first pendulous gyro accelerometer to said means for rotating said first pendulous gyro accelorometer and means connecting said signal generator of said second pendulous gyro accelerometer to said means for rotating said second pendulous gyro accelerometer, (b) base means;

(c) means for attaching said first, second, and third gyroscopic devices to said base means so the input axes of said devices form substantially equal angles with respect to a reference vector;

(d) means attached to said first, second, and third gyroscopic device and responsive to rotation of said pendulous gyro accelerometers to provide signals; and (e) signal separation means responsive to said output signals from said attached means for separating said output signals into components, said output signals being relatively free of errors due to drift in said accelerometers.

References Cited in the file of this patent

UNITED STATES PATENTS

| | | |
|---|---|---|
| 2,925,736 | Mueller | Feb. 23, 1960 |
| 2,958,522 | Slater | Nov. 1, 1960 |
| 2,968,949 | Lassen | Jan. 24, 1961 |
| 3,041,883 | Aske | July 3, 1962 |